Hogan

[15] 3,638,006
[45] Jan. 25, 1972

[54] SOLID-STATE CORRELATOR
[72] Inventor: James J. Hogan, Akron, Ohio
[73] Assignee: Goodyear Aerospace Corporation, Akron, Ohio
[22] Filed: Dec. 11, 1969
[21] Appl. No.: 884,105

Related U.S. Application Data

[63] Continuation-in-part of Ser. No. 708,919, Feb. 28, 1968, Pat. No. 3,483,421.

[52] U.S. Cl. .................235/181, 250/209, 250/220 M X, 307/311, 324/77 K, 328/2
[51] Int. Cl. ........................................................G06g 7/19
[58] Field of Search............235/181, 194, 193; 250/220 M, 250/83.3 HP, 209; 315/10; 307/311; 328/2

[56] References Cited

UNITED STATES PATENTS

| | | | |
|---|---|---|---|
| 3,177,350 | 4/1965 | Abbot et al. | 235/194 X |
| 3,210,549 | 10/1965 | Van Santen et al. | 250/220 M X |
| 3,271,576 | 3/1970 | Turner | 250/220 M X |
| 3,502,885 | 3/1970 | Stewart | 250/220 M X |

OTHER PUBLICATIONS

Anantha et al.: Fabricating Schottky Barrier Photodiodes and Diode Arrays
Fang et al.: Solid State Image Correlator both from: IBM Technical disclosure Bulletin Vol. 12, No. 1 June 1969

Primary Examiner—Malcolm A. Morrison
Assistant Examiner—Felix D. Gruber
Attorney—J. G. Pere and L. A. Germain

[57] ABSTRACT

The invention relates to a solid-state area correlation device which can be associated with other separate components to achieve a closed-loop correlation function between two images. Specifically, an amplified correlation signal is generated within a single, solid-state sandwich with optical image information impinging on both sides of the sandwich, where the construction of the sandwich is such that maximum current flow therethrough is achieved when maximum correlation of the impinging image information is achieved. Separate standard phase discriminating and integrating circuits of the images are associated with the package or sandwich to determine when correlation of the images occurs.

5 Claims, 4 Drawing Figures

INVENTOR
JAMES J. HOGAN
BY:
Oldham & Oldham
ATTORNEYS

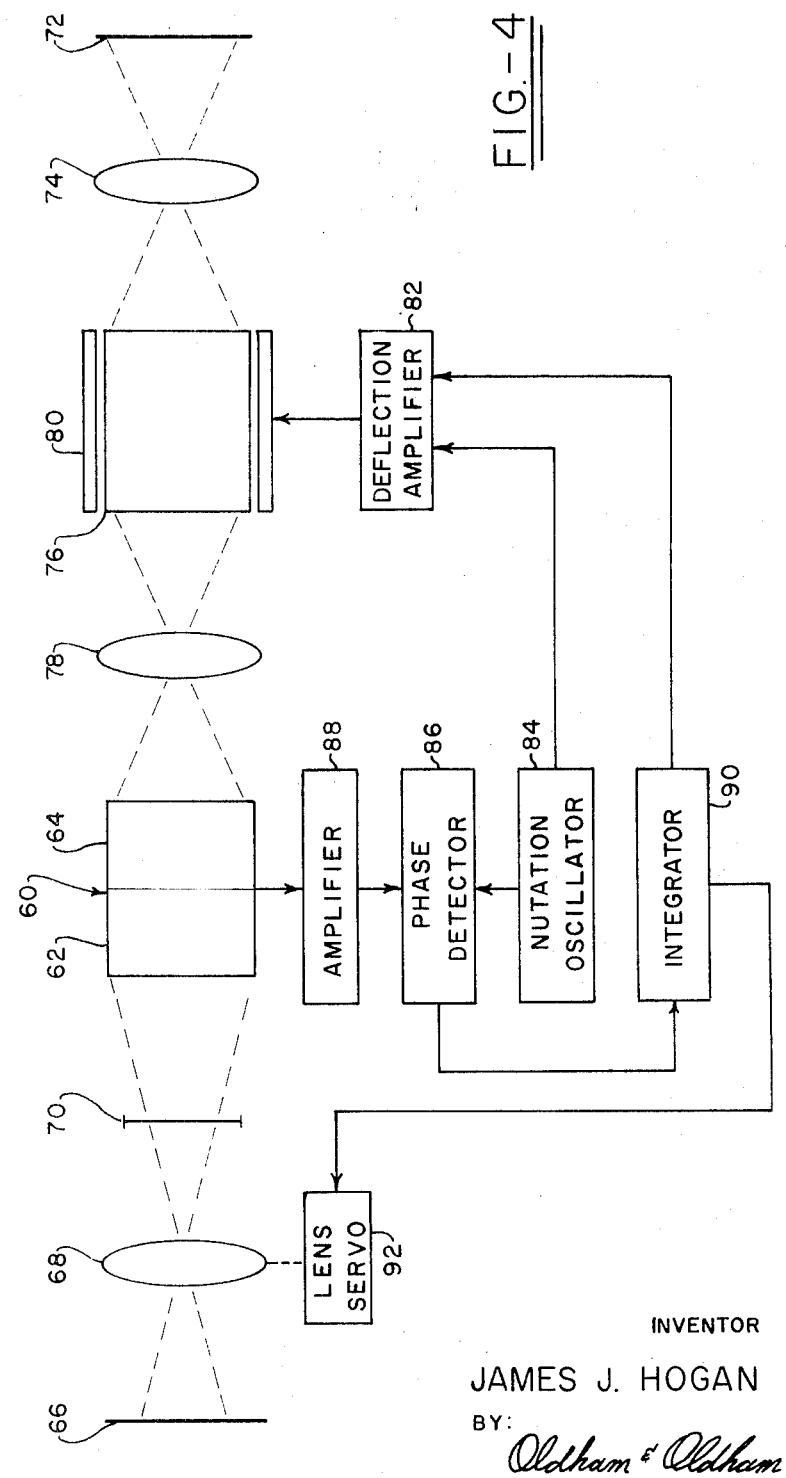

SOLID-STATE CORRELATOR

This application is a continuation-in-part of my prior application Ser. No. 708,919 filed Feb. 28, 1968, now U.S. Pat. No 3,483,421.

More specifically the package consists of an array of elements, each element consisting of a photodiode or phototransistor current source and a photoconductive resistive load. The elements are connected in parallel and the entire array is biased by a potential which effectively reverse biases the photodiodes, or the base-collector regions in phototransistors. The potential across each photoconductor is sensed by connecting a summing resistor to each element at the photoconductor-photodiode junction. The output at the summing point is the sum of the potentials across all the photoconductors when the common end of the photoconductors is referenced. The output signal is the quotient correlation signal between the two images, one image being focused on the photoconductor array, and the other on the photodiode array.

Heretofore, it has been known that an electron image tube might be used for correlation techniques as particularly pointed out in U.S. Pat. No. 3,194,511 and others of this general type. However, these electron correlation tubes require erase of the patterns stored on the grids and require separate components all positioned within the tube each being separately controlled electrically to achieve desired correlation. Further, an effort has been made to somewhat approximate a solid-state correlation device in my copending U.S. Pat application Ser. No. 708,919 for Electronic Area Correlator Tube filed Feb. 28, 1968. However, this device again requires the tube concept with all components positioned within the tube, and hence service and repair is greatly curtailed and the expense of tube construction is also quite high.

Therefore, it is the general object of the invention to avoid the aforesaid and other objections to prior art practices by the provision of a solid-state correlator which is a separate package that can be coordinated with other separate components to achieve a correlation function of two optical images.

A further object of the invention is to provide a solid-state correlator which is relatively inexpensive to manufacture, highly reliable in operation, and which can be readily utilized in a plug-in-type integrated circuit configuration.

For a better understanding of the invention reference should be had to the accompanying drawings wherein:

FIG. 4 is a block diagram illustrating the use of the solid-state correlator in a correlation mode.

A solid-state optical/optical correlator can be built on a single substrate or on two substrates separated by interconnecting circuitry. In the former, the interconnecting circuitry would be integrated into the chip. The device basically consists of an array of elements, each element consisting of a photodiode current source, a photoconductor load, a connecting wire, and a summing resistor connected to the connecting wire. The power potential is connected to the array in such a way that the photodiodes are reversed biased. The free ends of all the diodes are connected in common and the free ends of all the photoconductors are connected in common. These two common points are then appropriately connected to the biased potential. The summing point of the operational amplifier consists of a grid which connects all the summing resistors of all the elements.

Figure 1:
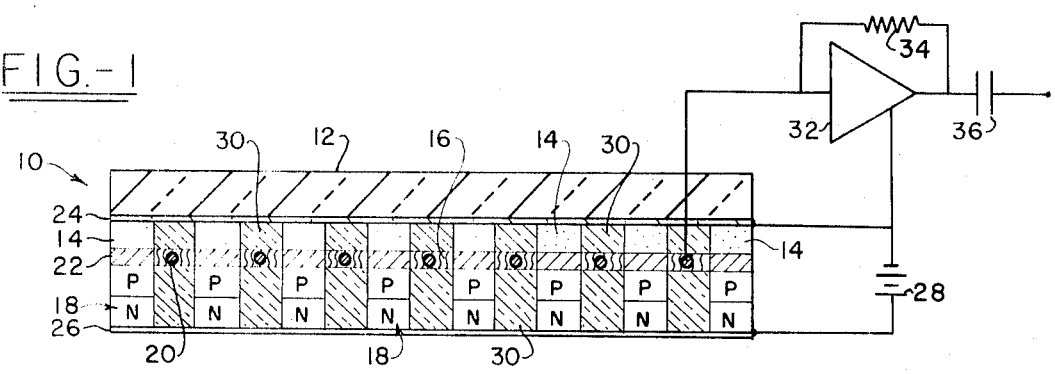
FIG. 1 is an enlarged broken away cross-sectional illustration of the solid-state correlator made according to a preferred construction of the device.

This scheme is quite clearly shown in FIG. 1 of the drawings where the numeral 10 indicates generally a solid-state correlator which comprises an optical clear substrate 12 to which everything is attached. A plurality of photoconductors are equally spaced over the face of the substraight 12 and are indicated generally by numerals 14. The resistive material is indicated generally by numeral 16 while the photodiodes are indicated generally by numeral 18. A wire grid 20 extends between all the components and is electrically connected to the resistive material 16. A conducting interface material 22 is provided between the photoconductors 14 and the diode multipliers 18. Transparent electrically conductive layers 24 and 26 encapsulate the package and are connected to a power source such as a battery 28 to thereby provide a potential across each of the photoconductor diode multiplier sets 14, 22 and 18. Insulation material 30 is positioned between each of the sets to complete the solid-state array. The grid 20 is connected through an amplifier 32 for utilization in the remainder of the circuit as is indicated in FIG. 4 defined below. A suitable bypass resistor 34 and capacitor 36 complete the readout amplification circuit taken off grid 20.

Figure 2:
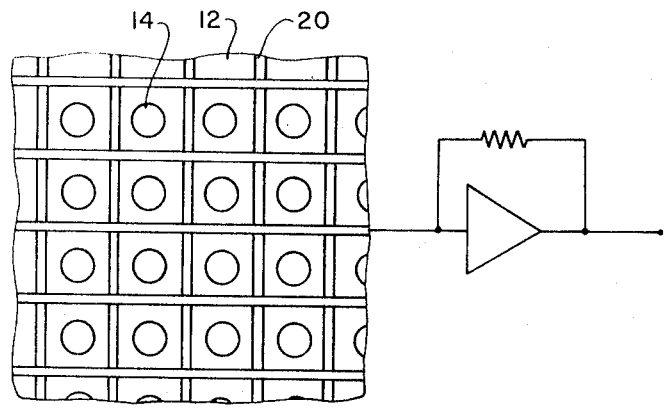
FIG. 2 is an enlarged broken away plan view of the correlator of FIG. 1.

FIG. 2 illustrates the embodiment of FIG. 1 in plan view and shows the relationship of the substrate 12 to the photoconductors 14 as well as the position of grid 20. The invention contemplates that good correlation performance can be obtained with approximately 400 photoconductors 14 and photodiodes 18. A 400-element array system could be readily fabricated using discrete photoconductors and phototransistors. Such a device could be mounted on a mounting board with 100 mil centers for the photosensitive elements. The active area of each array would be approximately 4 square inches. Discrete resistors could be used for the summing-resistor array.

For improved resolution (more photosensitive elements) and/or reduced active areas and overall size, thin-film, thick-film and integrated circuits are contemplated. In fact, combination of thick and thin film photoconductor arrays and summing resistor arrays and thin-film and single-chip photodiode arrays could be fabricated. The single-chip photodiode arrays would be those common to silicon and germanium chip technology. The thin and thick film arrays would typically use the II–VI and IV–VI compounds such as cadmium-sulfide, lead sulfide, etc. Using these techniques and materials, center spacings of as low as 1 mil could be obtained allowing 1,000×1,000 elements per square inch.

If as a modification it is desired to incorporate into the device an electronic scanning capability such as a flying spot scanner, this can be done by having two sets of conducting strips placed orthogonally to each other and isolated from one another by some portion of the array elements. Thus, in FIG. 1, the conductor 24 would be placed down in strips and grid 20 would be placed down in strips; with the strips 24 and 20 being mutually orthogonal. The potential 28 would be scanned over strips 20. The scanning sequence forms a television video raster. The scanning technique is conventional, such as FETs connected to each strip.

It should be evident to those skilled in the art that either of the devices discussed can be incorporated in a correlation system where a total optical image is projected onto each side of the solid-state package and total correlation can then be obtained by a readout of the grid 20 of FIG. 1. Also, a raster scan could be utilized from one side of the package with an image focused on the photoconductor array or the photodiode array, respectively. A video signal might be used for TV monitoring of the photoconductor image.

Figure 3:
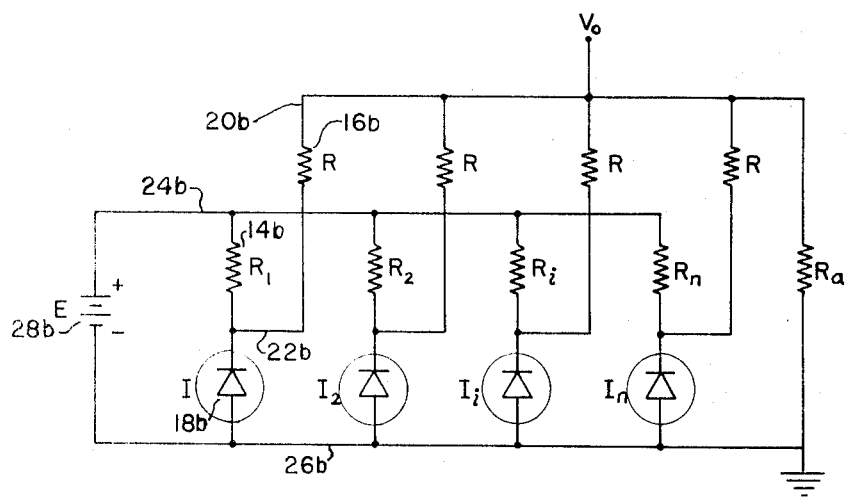
FIG. 3 is an equivalent circuit of the solid-state correlator.

An equivalent electrical circuit to the structure of FIG. 1 is illustrated in FIG. 3. Similar numbers with suffix b have been used to show similar functional components.

$$V_o = \frac{R_a/R}{1+n(R_a/R)} \sum_{i=1}^{n} (-R_i I_i + E)$$

For $$\frac{nRo}{R} \gg 1$$

$$V_o = \frac{1}{n}\sum_{i=1}^{n} R_i I_i$$

Relationship to FIG. 1.

$I_i$ is equivalent to component 18
$R_i$ is equivalent to component 14
$R$ is equivalent to component 16
$V_o$ is the correlation signal generated by a degree of quotient match of the $R_i$ array and the $I_i$ array.

A typical overall block diagram to achieve correlation with the solid-state correlator 10 of FIG. 1 is illustrated in FIG. 4 of the drawings where the numeral 60 generally illustrates the solid-state package with the photoconductor array indicated by numeral 62 and the photoconductor array 62 through a lens 68, and a shutter 70. A second image 72 is projected onto the photodiode array 64 through a lens 74 and image tube 76 and a second lens 78. The image tube 76 is a conventional-type tube which receives an optical image on one end and puts out an optical image on the other end.

Such tubes are available through International Telephone and Telegraph, among other companies in the field. The image within tube 76 is an electronic image and can be moved, nutated, or changed by appropriately driving an electrical coil 80 surrounding tube 76 by means of a deflection amplifier 82. The amplifier 82 is driven by a nutation oscillator 84. The remainder of the circuit comprises a phase detector 86 being driven by a signal received by amplifier 88 which in turn receives the output from the array 60. The loop in this correlation sequence is closed by the output of the phase detector 86 driving an integrator 90 with the integrator 90 controlling the deflection amplifier 82 and a lens servo 92 which cooperates with lens 68 to effect nutation or image control of image 66.

The shutter 70 is used to take advantage of the excitation storage capability of the photoconductors. In some applications the shutters is not needed. In applications where one image is to be compared to a standard reference, the lens servo 92 is not needed and 66 is now the reference.

One of the characterizing features of the invention should now be evident, and this is that the solid-state device 60 can be a separate and distinct part in an overall correlation system, thus actually reducing the cost over those integral tube approaches shown in prior U.S. Pat. Nos. 3,290,546, 3,290,674 and 3,413,515. Further, the separate component approach illustrated in FIG. 4 greatly simplifies correlation maintenance and upkeep expense because if one component fails, the entire system does not have to be replaced but only that component.

Hence, it should be seen that the objects of the invention have been achieved by providing a solid-state array that can be used as a discrete component in a correlation system. A conducting grid connected electrically to island conductors through a thin film resistive layer with each island conductor mounted to a respective photosensitive mound which cooperates with a P-semiconductor and a N-semiconductor material that is also photosensitive achieves a quotient correlation which in effect compares the quotient of the incident optical image impinging on the photoconductive material divided by incident photon density in the N- and P-semiconductive materials. The technique of summation from a parallel circuit is a standard analog computer technique. The use of a grid provides the parallel circuit. It is important to the operation of the package that the resistance of the resistive layer be at least 10 times greater than the electrical resistance of the photoconductive material. The resistive layer might be made from gold or nickel, or in some instances a tantalum film might be easier to deposit. Normally, its thickness will fall in the range of being between 100 or 1,000 angstroms. However, any standard resistive material can be utilized. In fact, the resistor array could consist of discrete elements.

While in accordance with the Patent Statutes only one best known embodiment of the invention has been illustrated and described in detail, it is to be particularly understood that the invention is not limited thereto or thereby, but that the inventive scope is defined in the appended claims.

What is claimed is:

1. A solid-state device for use in a correlator consisting of an array of separate elements each consisting of
   a photodiode current source,
   a photoconductive resistive load,
   a summing resistor connected between the source and load,
   means to place an electrical bias across the photodiode current source and the photoconductive resistive load, and
   means to sum the potentials across all the photoconductive resistive loads by referencing the common end thereof.

2. A device for use in a correlator according to claim 1 where each element is electrically insulated from each other, but all are electrically connected in parallel whereby the current passage through the total array can be determined.

3. A device for use in a correlator according to claim 1, where the array is a lamination consisting of an insulating transparent substrate, a transparent conductive coating deposited on the substrate, a plurality of separate photoconductors uniformly positioned over the conductive coating, a conductive layer over each photoconductor, a photodiode over each conductive layer, a grid between the photoconductors and photodiodes, and a resistive layer between the grid and the conductive layer between the photoconducts and photodiodes, and means to detect the voltage on the grid.

4. A solid state correlator comprising
   an array of separate elements uniformly positioned over an optically clear substrate so as to be electrically insulated, but in as close a proximity to each other as possible, each element consisting of
   a photodiode current source, and a photoconductive resistive load, a summing resistor connected between the source and means to sum the potentials across all the photoconductive resistive loads by referencing the common end thereof,
   a closed housing encapsulating the entire array, means to project separate optical images onto the photodiodes and photoconductive resistive loads, means to effect a movement of at least one image relative to the side of the array onto which it is projected, and means receiving the signal from the referenced end of each resistive load and generating a correlation function between the images.

5. A correlator including a device which comprises an array of separate elements each consisting of a photodiode current source, a photoconductive resistive load, a summing resistor connected between the source and load, means to place an electrical bias across the photodiode current source and the photoconductive resistive load, and means to sum the potentials across the photoconductive resistive load by referencing the common end thereof, which further includes means to illuminate each side of the array of elements with a reference optical image on one side and a present optical image on the other side, means to phase detect the voltage-referenced end of the conductive resistive loads, and means to integrate the phase-detected signal, and means to reposition at least one of the optical image onto its side to effect the correlation therebetween.

* * * * *